United States Patent [19]

Foley et al.

[11] Patent Number: 5,261,948
[45] Date of Patent: Nov. 16, 1993

[54] CARBON MOLECULAR SIEVE FOR THE KINETIC SEPARATION OF ACID GASES AND FLUOROCARBONS

[75] Inventors: Henry C. Foley; Ravindra K. Mariwala, both of Newark; Leo Manzer, Wilmington, all of Del.

[73] Assignees: University of Delaware; E. I. Du Pont de Nemours Co., both of Wilmington, Del.

[21] Appl. No.: 943,433

[22] Filed: Sep. 10, 1992

[51] Int. Cl.$^5$ .................................................. B01D 53/04
[52] U.S. Cl. ........................................ 95/142; 95/903; 502/420; 502/437
[58] Field of Search .................. 55/71, 74, 75, 387, 55/389; 502/416, 420, 437

[56] References Cited

U.S. PATENT DOCUMENTS

| | | | |
|---|---|---|---|
| 3,960,768 | 6/1976 | Ripperger et al. | 502/420 X |
| 4,046,709 | 9/1977 | Yuki | 55/75 X |
| 4,118,341 | 10/1978 | Ishibashi et al. | 502/437 X |
| 4,157,376 | 6/1979 | Vulikh et al. | 55/71 X |
| 4,775,655 | 10/1988 | Edwards et al. | 502/416 |
| 4,790,859 | 12/1988 | Marumo et al. | 55/75 X |
| 4,810,266 | 3/1989 | Zinnen et al. | 55/75 X |
| 4,820,318 | 4/1989 | Chang et al. | 55/68 |
| 4,820,681 | 4/1989 | Chang et al. | 502/418 |
| 4,832,881 | 5/1989 | Arnold, Jr. et al. | 502/416 X |
| 4,902,312 | 2/1990 | Chang | 55/71 |
| 4,906,796 | 3/1990 | Yates | 570/179 |
| 4,940,824 | 7/1990 | Yates | 570/179 |
| 4,940,825 | 7/1990 | Yates | 570/179 |
| 4,957,897 | 9/1990 | Maroldo et al. | 502/437 X |
| 5,021,391 | 6/1991 | Agui et al. | 502/437 X |
| 5,166,123 | 11/1992 | Agui et al. | 502/437 X |

FOREIGN PATENT DOCUMENTS

| | | | |
|---|---|---|---|
| 0282053 | 9/1988 | European Pat. Off. | 55/389 |
| 49-010899 | 1/1974 | Japan | 502/420 |
| 52-006387 | 1/1977 | Japan | 55/389 |
| 52-011184 | 1/1977 | Japan | 55/389 |
| 52-075690 | 6/1977 | Japan | 55/389 |
| 0665932 | 6/1979 | U.S.S.R. | 55/71 |
| 1375900 | 11/1974 | United Kingdom | 55/75 |
| 90/08751 | 8/1990 | World Int. Prop. O. | |

OTHER PUBLICATIONS

American Chemical Society, Henry C. Foley, Chapter 21, "Carbon Molecular Sieves", pp. 335-360, 1988.
Ind. Eng. Chem. Res., Lafyatis et al., vol. 30, "Poly(furfuryl alcohol)-Derived Carbon Molecular Sieves: Dependence of Adsorptive Properties on Carbonization Temperature, Time, and Poly(ethylene glycol) Additives", pp. 865-873, 1991.
American Cyanamid Company, Valentine et al., Chemical Research Division, "Novel Carbon Molecular Sieve Catalysts for Wax Suppression in the Fischer-Tropsch Reaction—Final Technical Report", Jun. 1987.
"Adsorption", Chapter 12, Keller et al., pp. 644-696.
American Chemical Society, Chapter 8, "Gas-Adsorption Processes: State of the Art", pp. 145-169, 1983.

*Primary Examiner*—Robert Spitzer
*Attorney, Agent, or Firm*—Connolly and Hutz

[57] ABSTRACT

A method for the preparation of a carbon molecular sieve capable of separating acid gases and fluorocarbons of the formula $C_aH_bX_cF_d$, wherein a is from 1 to about 6, b is from 0 to about 13, c is from 0 to about 13, d is from 1 to about 14, and X is a halogen; on the basis of shape selectivity and size exclusion. A precursor resin is heated at about 0.2° C. per minute to about 500° C. Then the resin is soaked at about 500° C. for about 6 hours in flowing inert gas.

22 Claims, 3 Drawing Sheets

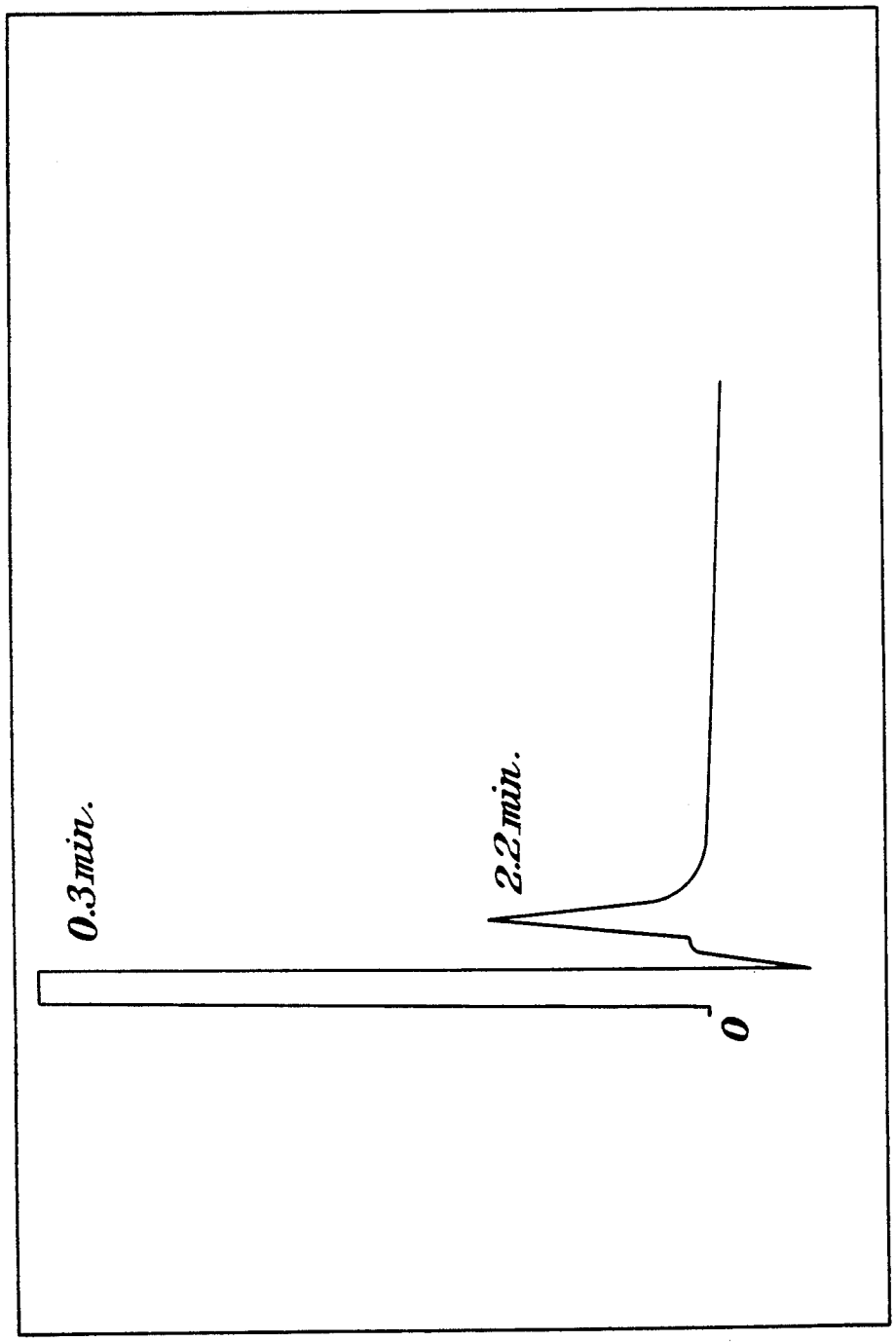

CARBON MOLECULAR SIEVE FOR THE KINETIC SEPARATION OF ACID GASES AND FLUOROCARBONS

BACKGROUND

Hydrofluorocarbons (HFCs) and hydrochlorofluorocarbons (HCFCs) are considered to be useful alternatives to traditional chlorofluorocarbons (CFCs) in a variety of application from refrigeration, and cleaning, to blow molding of polymers. These compounds have shorter atmospheric residence times and decompose at lower altitudes than CFCs, because of the presence of reactive carbon-hydrogen bonds. This behavior is less deleterious to the upper atmosphere since much less ozone is decomposed by chlorine radicals for HCFCs and since there is no ozone loss for HFCs.

Although these compounds are beneficial to the environment they are more difficult to synthesize and to purify than the CFCs. This difficulty arises from the propensity of HFCs and HCFCs to hydrogen bond with other organics and acid gases, especially HF, a common by-product of HFC and HCFC synthesis. These hydrogen bonding effects result in azeotropes and pinch-points in the vapor liquid equilibria (VLE) of mixtures of these compounds.

Pinch-points and azeotropes complicate standard approaches to separations of product streams. Pinch-points require larger columns with higher numbers of trays (plates) and azeotropes cannot be separated by standard distillation. Distillation must be done by extraction in two column systems, or the azeotrope must be "cracked" at low temperatures using cryogenic methods. In every case the cost of separation increases considerably with the complexity or size of the unit operation or operations to be employed.

The theoretical concepts dealing with the mechanisms of absorptive separations are well known to those trained in the art. Good discussions are provided by R. T. Yang, *Gas Separation by Adsorption Processes*, Butterworths, Boston (1987) and D. M. Ruthven, *Principles of Adsorption and Adsorption Processes*, Wiley, New York (1984).

In comparing the relative merits of a standard distillative separation versus a less standard absorptive separation certain criteria need to be met in order for the latter to be more efficient than the former. In most cases distillation is the most cost effective and simplest operation employed for separation. However, criteria can be established and met under some circumstances that suggest the preferential use of absorption technology. These criteria have been reviewed in a number of places and are familiar to anyone trained in the art. G. E. Keller, R. A. Anderson and C. M. Yon, "Adsorption", in *Handbook of Separation Process Technology*, R. W. Rosseau, Ed. Wiley, New York, (1987), pp. 644–696 have done a particular service to the field by clearly enumerating these criteria, as has G. E. Keller III, "Gas-Adsorption Processes", in *Industrial Gas Separations*, ACS Sym. Series 223, T. E. Whyte, Jr., C. M. Yon, E. H. Wagner, Eds., ACS, Washington (1983), pp. 145-171 in an earlier work. In particular these authors state that adsorptive separations should be considered as an alternative to distillation, when the relative volatility between the key components to be separated is between 1.2 to 1.5 or less—as is the case for azeotropic mixtures—and when separations by distillation require multiple columns or cryogenic operation. Of course these criteria require that a suitable sorbent can be identified which carries out the separation efficiently and economically.

The choice of a suitable sorbent is also made on the basis of the separation mechanism it imparts on the mixture. This is important for the following reasons. If the product stream to be separated is high in concentration of less valuable, and less strongly adsorbed component, then a simple equilibrium driven separation is ideal. The minor component builds in concentration on the sorbent surface until full capacity is reached, the feed is swung to a second column and finally it is regenerated to strip off the pure, high value component. Here the sorbent bed can be relatively small with low capital expenditures, and the cycle time can be long with low operating and process costs. Activated carbon, silica or some other sorbent can be suitable for such a simple process approach.

Similarly, if a stream rich in a value-added component is contaminated by one or more minor components, then a straightforward equilibrium-driven separation over a standard sorbent can be used, provided the impurities are more strongly sorbed than the major component.

However, this may not always hold. Specifically, if one has a stream which is contaminated by impurities, and the mixture is difficult to separate by distillation—according to the criteria mentioned—and if the impurities are not more strong sorbed than the major component, then a simple equilibrium separation may not be feasible. The reason is that in order to carry out the separation, the carbon bed would have to be too large to be economical. Process costs would be expected to scale with the bed size.

In this type of situation, which can often be the case with HFC and HCFC product streams, a different sorptive mechanism over a non-standard sorbent can be considered. Once again the key, as pointed out generally by Keller et al. (1987), is the choice of a suitable sorbent. It is often true that the more strongly "held" molecule is also larger, if all other factors are roughly equal. When this is true then "shape-selective" separations can be used. Here the separation is driven by the differential rates of uptake of components in the mixture on a molecular sieving sorbent. At one extreme the pore structure of the sorbent completely restricts access of one or more components of the mixture to the inner sorbent surface. At the other extreme the separation is based on different fluxes into the sorbent, which in turn are based on different diffusivities for different sized components.

Zeolites can be expected to show shape selective separations because of their molecular-sized pores. A variety of examples are provided in the literature (Yang, 1987), Ruthven (1984). Although useful for some separations of HFC and HCFC containing mixtures, they are not useful for the separations of mixtures that contain acid gases, especially HF since they are detrimentally reacted with and consumed by the acid.

An alternative to zeolites are the carbon molecular sieves (CMS) which are shape and size selective, but are not consumed by acid gases. Commercial applications of carbon molecular sieves are typified by the recovery of pure nitrogen from air in a pressure swing adsorption process. Although oxygen and nitrogen differ in size by only 0.2 Å, the separation is efficient. This arises from the fact that the rate of transport of oxygen into the carbon sieve pore structure is markedly higher than that of nitrogen. Hence, the kinetic separation works, even though the equilibrium loading levels of $O_2$ and $N_2$ are virtually identical, and therefore would not provide any separation. These effects have been considered by Yang (1987).

Carbon molecular sieve-based separations of fluorocarbons have been investigated for particular separations. S. F. Yates, U.S. Pat. No. 4,940,824 reports that carbon molecular sieve can be used for the removal of vinylidene chloride from HCFC-141b. In a separate disclosure, U.S. Pat. No. 4,940,825, Yates reports that dichloroacetylene is separated or removed from HCFC-141b and/or vinylidene chloride over a carbon molecular sieve with a mean pore size of 4.2-4.5 Å. In both cases the examples indicate that the carbon molecular sieve strongly adsorbed the impurity molecules, thereby stripping them from the feed. In none of the examples was a CMS material regenerated or shown to be regenerable. Similarly, in S. F. Yates, U.S. Pat. No. 4,906,796 (1990) teaches that R-1122 (2-chloro-1,1-difluoroethylene) can be substantially removed from HFC-134a ($C_2F_4H_2$) by selective sorption of the R-1122 into either CMS or 5A zeolite, with the latter preferred. Here also the key to the separation is the strong absorption of the impurity molecules into the pore structures of either the CMS or the zeolite.

For each of the cases mentioned it was noted that the carbon molecular sieves utilized were prepared from polymeric precursors that did not contain oxygen. This goes back to the teaching of Chang in U.S. Pat. No. 4,820,681. This patent describes the methodology for the synthesis of the CMS material used in each of the subsequent process patents. Particularly important to these applications is the use of a cross-linked polymer precursor which is oxygen free. An example is a polymer made from vinylidene fluoride (PVDF) and cross-linked with divinyl benzene.

SUMMARY OF THE INVENTION

This invention involves carbon molecular sieves suitable for the kinetic separation of hydrogen fluoride azeotropes. This invention provides a new composition of matter for a carbon molecular sieve for the separation of acid gases and fluorocarbons of the general formula, $C_aH_bX_cF_d$ where a is from 1 to about 6, b is from 0 to about 13, c is from 0 to about 13, d is from 1 to about 14, and X is a halogen. The carbon molecular sieve is made from a precursor and has a pore size of about 4.5 to about 5.5 Å.

One aspect of the invention is a method for the preparation of a carbon molecular sieve capable of separating acid gases and fluorocarbons of the formula $C_aH_bX_cF_d$, wherein a is from 1 to about 6, b is from 0 to about 13, c is from 0 to about 13, d is from 1 to about 14, and X is a halogen; on the basis of shape selectivity and size exclusion, comprising:

a) heating a precursor resin at about 0.1° to 2° C. per minute to about 400° C. to about 800° C. and b) soaking at about 400° C. to about 800° C. for at least 1 hour in flowing inert gas.

Another aspect of the invention is a process for the purification of HCF-134a ($CF_3CH_2F$) by the removal of HF in the azeotropic mixture, comprising a bed of molecular sieving carbon prepared as stated above in contact with the mixture at a temperature in the range of 150°-250° C. and preferably approximately 200° C. and at about 1 to about 5 atm pressure and with a gas hourly space velocity between about 100 to about 1000.

Another aspect of this invention, is to use a precursor that does not have to be oxygen free.

Another aspect of this invention, is to develop a method of purifying $C_aH_bX_cF_d$.

The invention can be practiced with an azeotropic mixture that can be separated over large pore, activated carbons at an economical cost.

BRIEF DESCRIPTION OF THE DRAWINGS

FIG. 6 is a graph showing an example of the reverse order of elution according to this invention.

DESCRIPTION OF THE INVENTION

Figure 1:
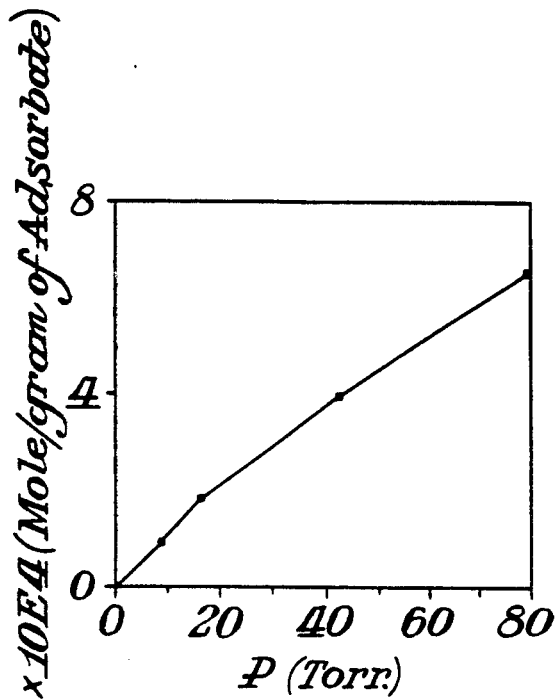
FIG. 1 is a graph showing the HFC-134a isotherm on coconut charcoal.

This invention provides a new composition of matter for carbon molecular sieve for the separation of acid gases like HF, HCl and others from fluorocarbons. The fluorocarbons can be of the general formula: $C_aH_bX_cF_d$ wherein "a" is from about 1 to about 6, preferably from about 2 to about 4, and even more preferably 2; "b" is from 0 to about 13, and preferably from 0 to about 6, and even more preferably 2; "c" is from 0 to about 13, and preferably from 0 to about 6, and more preferably 0; "X" is a halogen, preferably chlorine, fluorine or bromine, and even more preferably chlorine; and "d" is from 1 to about 14, and preferably from about 2 to about 6, and more preferably 4. The carbon molecular sieve has a pore size of about 4.5 to about 5.5 Å. The carbon molecular sieve is made from a precursor. The preferred examples of the precursors that can be used include PAN (polyacrylonitrile), PFR (phenol formaldehyde resin), PVDC (polyvinylidene chloride), PFA (polyfurfuryl alcohol) or any combinations of the above.

Another aspect of the invention is a method for the preparation of a carbon molecular sieve capable of separating acid gases and fluorocarbons of the formula $C_aH_bX_cF_d$, wherein a is from 1 to about 6, b is from 0 to about 13, c is from 0 to about 13, d is from 1 to about 14, and X is a halogen; on the basis of shape selectivity and size exclusion, comprising:

a) heating a precursor resin at about 0.1° C. to 2° C. per minute to about 400° C. to about 800° C., preferably from 450° C. to about 600° C., and more preferably about 500° C., and b) soaking at about 400° C. to about 800° C., preferably from about 450° C. to about 600° C., and more preferably at about 500° C. for at least 1 hour in flowing inert gas. The preferable time would be for about 4 to about 6 hours and more preferably for about 6 hours. The preferable inert gas is helium. The process for the purification of HCF-134a ($CF_3CH_2F$) by the removal of HF in the azeotropic mixture, comprising a bed of molecular sieving carbon prepared as stated above in contact with the mixture at approximately 150°-250° and preferably at 200° C. and at about 1 to about 5 atm pressure and with a gas hourly space velocity between about 100 to about 1000.

Among the more difficult separations in the field of alternate fluorocarbons processing is the removal of HF from HFC-134a, since these form a strong azeotrope (97% HFC-134a, 3% HF). Although the separation can be done cryogenically, it is a less than an optimal solution to the process problem. Sorptive separations are of interest as an alternative means to purifying HFC-134a. As shown in the examples below, the azeotropic mixture can be separated over large pore, activated carbons. The basis for the separation on these materials is that the larger HFC-134a molecule is more strongly sorbed than the HF molecule, which under the conditions tested is virtually nonsorbing. Even though this provides a useful separation, the holdup of the more valuable organic molecule is in practical terms problematic, since a very large carbon bed would be required with long cycle times. This would translate into high capital and operating costs.

An alternative to the equilibrium-driven separation is a kinetic one based on shape selective effects. Medium and small pore zeolites are in the correct size domain, presumably, to do the separation on the basis of the different molecular size of HF and HFC-134a. However, because of their facile consumption by HF, the zeolites are—in native form—unsuited for this separation, or any other for that matter which involves a mixture containing HF. Carbon molecular sieves are materials that as a class have zeolite-like shape selective properties, but which are not reacted in a consumptive manner with HF and other acid gases.

The first two examples are demonstrations of equilibrium separations of the azeotrope over coconut charcoal and Calgon BPL carbon, derived from bituminous coal. The third example demonstrates that the separation can be made on Carbosieve G. Despite its name this carbon behaves as the first two and displays an equilibrium-driven separation. Examples 4 and 5 deal with the synthesis of a carbon molecular sieve that is able to provide a kinetic separation of the azeotrope. In a bed of this material the order of breakthrough or elution is the reverse of that obtained with activated carbon, since the smaller HF molecule is held-up for longer mean residence times than the HFC-134a.

EXAMPLE 1

A sample of Fischer coconut charcoal (80×100) mesh was loaded into a stainless steel column (9 ft × ¼ in O.D.) and the ends were plugged with steel wool. Before testing the sorbent was heated to 250° C. in flowing helium (40 sccm) for 16 hr. During the separation the column temperature was 200° C. and the helium flow rate was 75 sccm. A gas density analyzer was used to identify the eluents. The detector temperature was maintained at 120° C. with a current of 200 ma.

Retention times for HF and HFC-134a fed as the azeotropic mixture are provided in Table 1 as a function of the volume of gas injected on the bed.

TABLE 1

| Azeotrope Vol. (cc) | $t_{ret}$ (min) HF | $t_{ret}$ (min) 134a |
|---|---|---|
| 2 | 0.72 | 15 |
| 4 | 0.76 | 14 |
| 10 | 0.85 | 12 |
| 20 | 0.97 | 10 |

These data clearly show that the separation is effective. From an analysis of the retention time behavior with concentration an isotherm for HFC-134a on coconut can be determined (see FIG. 1). The isotherm is nearly linear and favorable.

EXAMPLE 2

Figure 3:
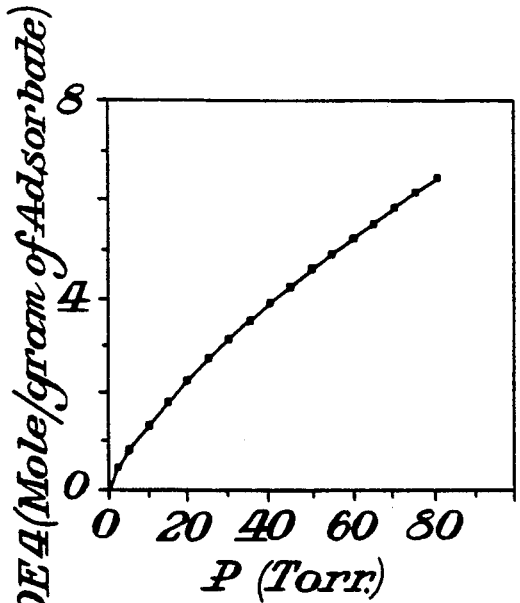
FIG. 3 is a graph showing the analysis of the breakthrough data for HFC-134a provided a mixture of the equilibrium isotherm under the conditions in Example 2.

Particles of Calgon BPL carbon (12×30) mesh were packed into a stainless steel tube (10 in × ⅜ in O.D.). The bed was pretreated in flowing helium (40 sccm) at 250° C. for 16 h. After lowering the temperature to 200° C., the next azeotropic mixture was fed to the bed at 25 sccm and at approximately 4 atm pressure. Analysis of the effluent gases were taken every minute to determine the HFC-134a and HF concentration. Based on these data the breakthrough curves for HF and HFC-134a are plotted in FIG. 2. HF elutes first as a nearly non-adsorbed gas, while the HFC-134a is eluted later due to the forces of stronger adsorption on the carbon. Analysis of the breakthrough data for HFC-134a provided a mixture of the equilibrium isotherm under these conditions, and this is shown in FIG. 3. The isotherm is virtually identical to that of HFC-134a on coconut charcoal.

EXAMPLE 3

Particles of Carbosieve G (80×100 mesh) were loaded into a stainless steel column (9 ft × ¼ in O.D). This material was pretreated and tested according to the methods and procedures described in Example 1. Table 2 lists the retention time behavior of HFC-134a and HF on Carbosieve G.

TABLE 2

| Azeotrope Vol. (cc) | $t_{ret}$ (min) HF | $t_{ret}$ (min) 134a |
|---|---|---|
| 0.5 | <1 | 14.5 |
| 1.0 | <1 | 14 |
| 2.0 | <1 | 13 |
| 4 | <1 | 12 |
| 10 | <1 | 11 |

Figure 4:
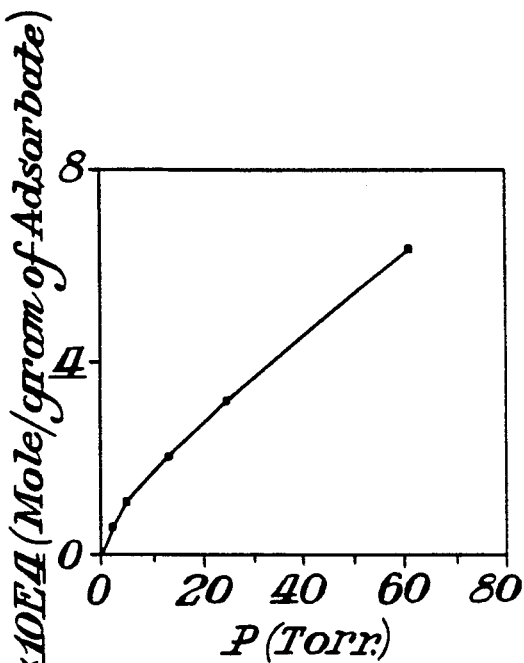
FIG. 4 is a graph showing the HFC-134a isotherm on Carbosieve G.
Figure 5:
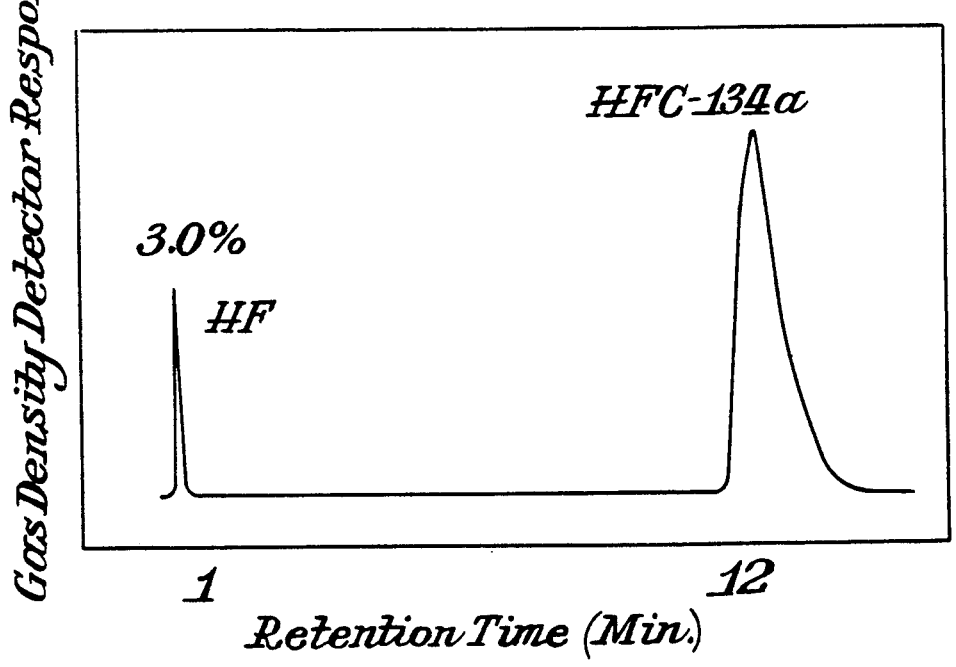
FIG. 5 is a typical chromatogram of this invention.

An analysis of these data provides the isotherm for HFC-134a on Carbosive G shown in FIG. 4. The isotherm is virtually identical to those already shown for HFC-134a on coconut charcoal and Calgon BPL. A typical chromatogram is displayed in FIG. 5.

EXAMPLE 4

Carbon molecular sieve was prepared from 60 g of polyfurfuryl alcohol (Durez resin) with a room temperature viscosity and specific gravity of 200 cp and 1.21 g/cc each. The resin was placed in a quartz boat and then into a tube furnace. Helium was flowed through the tube at 250 sccm and approximately 1 atm pressure. The sample was carbonized by heating at 0.2° C. per minute to 500° C., and then thermally soaked at 500° C. for 6 h. The product was cooled to room temperature under a steady flow of helium. The final CMS yield was 35.6% based on the mass of PFA.

EXAMPLE 5

The CMS material prepared in Example 4 was ground and sieved to recover 80×100 mesh particles. These were packed in two stainless steel columns (3 ft × ⅛ in O.D. and 12 ft × ⅛ in O.D.). At 200° C., 10 cc of the azeotropic mixture were injected onto the columns at a helium carrier gas flow rate of 25 sccm. The retention times for HF and HFC-134a on the two columns are given in Table 3.

TABLE 3

| Azeotrope Vol. (cc) | Column Length | $t_{ret}$ (min) 134a | $t_{ret}$ (min) HF |
|---|---|---|---|
| 10 | 12 | 0.9 | 12.8 |
| 10 | 3 | 0.3 | 2.2 |

An example of the reverse order of elution in this case is provided in FIG. 6.

We claim:

1. A process for the preparation of a carbon molecular sieve capable of separating acid gases and fluorocarbons of the formula $C_aH_bX_cF_d$, wherein a is from 1 to about 6, is from 0 to about 13, c is from 0 to about 13, d is from 1 to about 14, and X is a halogen; comprising the steps of:
   a) heating an oxygen containing precursor resin at about 0.1° to about 2° C. per minute to about 400° C. to about 800° C. and
   b) soaking to about 400° C. to about 800° C. for at least 1 hour in flowing inert gas.

2. A process as claimed in claim 1, wherein the carbon molecular sieve has a pore size of about 4.5 to about 5.5Å.

3. A process as claimed in claim 1, wherein the precursor resin is selected from the group consisting of polyacrylonitrile, phenol formaldehyde resin, polyvinylidene chloride, polyfurfuryl alcohol and a mixture thereof.

4. A process as claimed in claim 1, wherein the precursor resin is polyfurfuryl alcohol.

5. A process as claimed in claim 1, wherein the fluorocarbon is $CF_3CH_2F$.

6. A process as claimed in claim 1, wherein the inert gas in helium.

7. A process as claimed in claim 1, wherein the steps a) and b) are
   a) heating the precursor resin at about 0.1° to about 2° C. per minute to about 450° C. to about 600° C. and
   b) soaking to about 450° C. to about 600° C. for about 4 to 6 hours in flowing inert gas.

8. A process as claimed in claim 1, wherein the steps a) and b) are
   a) heating the precursor resin about 0.1° to about 2° C. per minute to about 500° C. and
   b) soaking to about 500° C. for about 6 hours in flowing inert gas.

9. A process for the purification of $CF_3CH_2F$ by the removal of HF in the azeotropic mixture, on the basis of shape selectivity and size exclusion comprising a bed of molecular sieving carbon prepared as in claim 1 which is contacted with the mixture at approximately 150°–250° C. and at 1 to 5 atm pressure and with a gas hourly space velocity between 100 and 1000.

10. A carbon molecular sieve made by the process of claim 1.

11. A carbon molecular sieve for the separation of acid gases from fluorocarbons said sieve comprising a precursor resin selected from the group consisting of polyacrylonitrile, phenol formaldehyde resin, polyvinylidene chloride, polyfurfuryl alcohol and a mixture thereof, and said sieve having a pore size of about 4.5 to about 5.5Å, said fluorocarbons having the general formula $C_aH_bX_cF_d$ wherein a is from 1 to about 6, b is from 0 to about 13, c is from 0 to about 13, and d is from 1 to about 14, and X is a halogen.

12. In a process for the separation of acid gases from fluorocarbons wherein the fluorocarbons have a general formula of $C_aH_bX_cF_d$ wherein a is from 1 to about 6, b is from 0 to about 13, c is from 0 to about 13, and d is from 1 to about 14, and X is a halogen, the improvement being in the use of a carbon molecular sieve comprising an oxygen containing precursor resin and having a pore size of about 4.5 to 5.5Å.

13. In the process as claimed in claim 12, wherein a is from 2 to about 4.

14. In the process as claimed in claim 12, wherein a is 2.

15. In the process as claimed in claim 12, wherein b is from 0 to about 6.

16. In the process as claimed in claim 12, wherein b is 2.

17. In the process as claimed in claim 12, wherien X is chlorine, fluorine or bromine.

18. In the process as claimed in claim 12, wherein X is chlorine.

19. In the process as claimed in claim 12, wherein c is from 0 to about 6.

20. In the process as claimed in claim 12, wherein c is 0.

21. In the process as claimed in claim 12, wherein d is from about 2 to about 6.

22. In the process as claimed in claim 12, wherein d is 4.

* * * * *

UNITED STATES PATENT AND TRADEMARK OFFICE
CERTIFICATE OF CORRECTION

PATENT NO.: 5,261,948

DATED: NOVEMBER 16, 1993

INVENTOR(S): FOLEY ET AL

Figure 2:
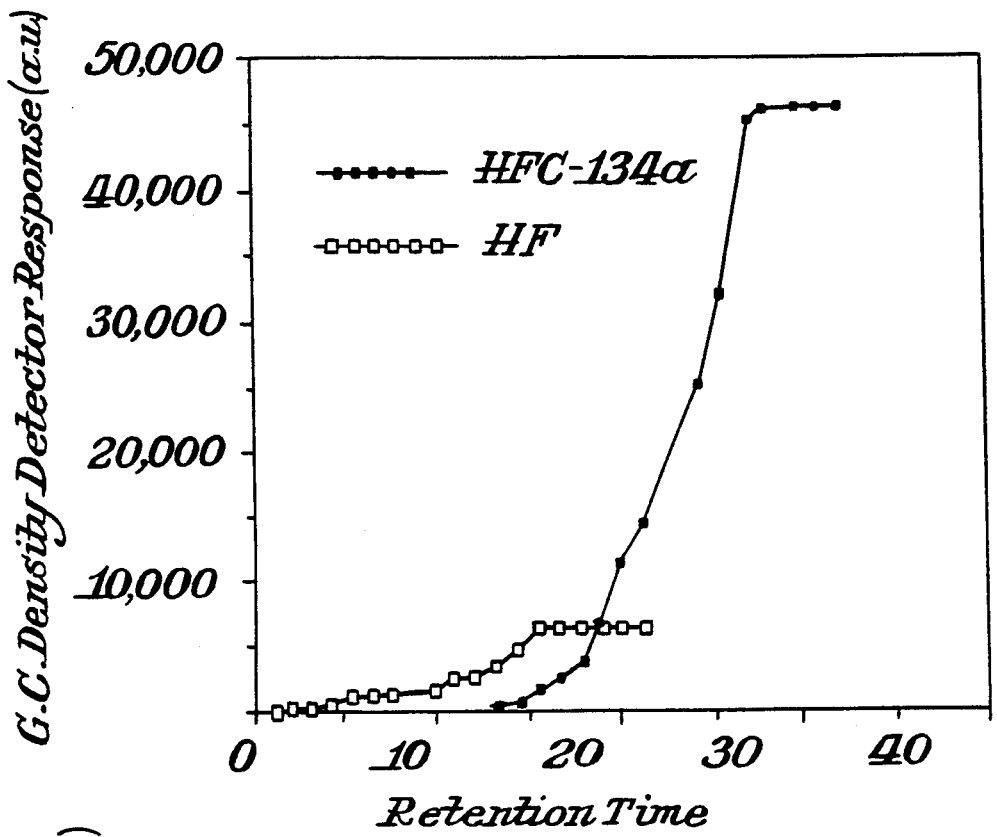
FIG. 2 is a graph showing the breakthrough curves of HF and HFC-134a on Calgon BPL Carbon.

It is certified that error appears in the above-identified patent and that said Letters Patent is hereby corrected as shown below:

In the Drawings, Sheet 2 of 3, Fig. 2, left hand margin, "G.C" should read --Gas--.

In the Drawings, Sheet 3 of 3, Fig. 6, "Detector Response" should read --Gas Density Detector Response (a.u.)--.

In column 1, line 16, after the phrase "chlorine radicals", the word "for" should read --from--.

In column 2, line 29, after the phrase "impurities are not more" the word "strong" should read --strongly--.

Signed and Sealed this

Nineteenth Day of July, 1994

Attest:

BRUCE LEHMAN

Attesting Officer   Commissioner of Patents and Trademarks